US008260487B2

(12) United States Patent
Plawecki

(10) Patent No.: US 8,260,487 B2
(45) Date of Patent: Sep. 4, 2012

(54) METHODS AND SYSTEMS FOR VITAL BUS ARCHITECTURE

(75) Inventor: Daniel Walter Plawecki, Ocala, FL (US)

(73) Assignee: General Electric Company, Schenectady, NY (US)

(*) Notice: Subject to any disclaimer, the term of this patent is extended or adjusted under 35 U.S.C. 154(b) by 1218 days.

(21) Appl. No.: 11/970,918

(22) Filed: Jan. 8, 2008

(65) Prior Publication Data
US 2009/0177356 A1 Jul. 9, 2009

(51) Int. Cl.
*G05B 23/02* (2006.01)
(52) U.S. Cl. ............ 701/31.7; 701/29.1; 701/29.7; 701/30.5; 701/30.6; 701/34.3; 340/3.1; 340/3.43; 340/506; 340/507; 340/508; 700/79; 700/81
(58) Field of Classification Search ............ 701/19, 701/20, 29, 31, 33, 34, 45; 340/3.1, 3.43, 340/438, 506, 507, 508; 700/79, 81
See application file for complete search history.

(56) References Cited

U.S. PATENT DOCUMENTS

| | | | | |
|---|---|---|---|---|
| 5,353,413 | A | * | 10/1994 | Novakovich et al. ......... 710/110 |
| 5,404,465 | A | * | 4/1995 | Novakovich et al. ......... 710/110 |
| 5,600,786 | A | | 2/1997 | Baker et al. |
| 6,047,222 | A | * | 4/2000 | Burns et al. .................... 700/79 |
| 6,201,997 | B1 | | 3/2001 | Giers |
| 6,424,900 | B2 | * | 7/2002 | Murray et al. .................. 701/48 |
| 6,502,019 | B1 | * | 12/2002 | Zydek et al. ................... 701/29 |
| 6,868,067 | B2 | * | 3/2005 | Rostron ........................ 370/241 |
| 7,117,119 | B2 | | 10/2006 | Van Dyk et al. |
| 7,290,170 | B2 | * | 10/2007 | Anderson et al. .............. 714/11 |

(Continued)

FOREIGN PATENT DOCUMENTS
DE 19857683 6/2000
(Continued)

OTHER PUBLICATIONS

F. Ye "Justifying the Use of COTS Components within Safety Critical Applications," Ph.D thesis, University of York, York, England, 2005.*

(Continued)

*Primary Examiner* — Thomas G. Black
*Assistant Examiner* — Peter D Nolan
(74) *Attorney, Agent, or Firm* — GE Global Patent Operation; John A. Kramer

(57) ABSTRACT

Methods and systems for a vital bus system for communicating data in a control system are provided. The system includes a plurality of data communication buses configured in a multiple redundant orientation and at least one safety supervisor module including a database including a plurality of logic rules. The logic rules are programmed to receive data from the plurality of data communication buses and to determine the validity of the received data from each bus using one or more of the plurality of the logic rules. If the received data is invalid, the logic rules are programmed to restore the validity of the data using one or more of the plurality of the logic rules. If the data can not be restored the logic rules are programmed to transmit an alert to the control system. Otherwise, the logic rules are programmed to transmit the validated data to an intended destination.

10 Claims, 4 Drawing Sheets

U.S. PATENT DOCUMENTS

| | | | |
|---|---|---|---|
| 7,406,370 B2 * | 7/2008 | Kojori et al. | 701/22 |
| 7,586,953 B2 * | 9/2009 | Forest et al. | 370/503 |
| 7,676,286 B2 * | 3/2010 | Disser et al. | 700/82 |
| 2002/0040252 A1 * | 4/2002 | Behr et al. | 700/79 |
| 2005/0027374 A1 | 2/2005 | Van Dyk et al. | |
| 2005/0027379 A1 | 2/2005 | Dyk et al. | |
| 2005/0113942 A1 | 5/2005 | Longsdorf et al. | |
| 2006/0042846 A1 | 3/2006 | Kojori et al. | |
| 2006/0087967 A1 * | 4/2006 | Landwehr et al. | 370/228 |
| 2006/0142873 A1 | 6/2006 | Opem et al. | |
| 2007/0005203 A1 * | 1/2007 | Sundaram et al. | 701/33 |
| 2007/0076333 A1 | 4/2007 | Battani | |
| 2007/0089096 A1 | 4/2007 | Van Dyk et al. | |
| 2007/0286225 A1 * | 12/2007 | Enders et al. | 370/438 |
| 2008/0217471 A1 * | 9/2008 | Liu et al. | 244/1 R |

FOREIGN PATENT DOCUMENTS

| | | |
|---|---|---|
| GB | 2277814 | 9/1994 |
| WO | 9625707 A1 | 8/1996 |
| WO | WO 2006002695 A1 * | 1/2006 |

OTHER PUBLICATIONS

English language abstract of DE 19857683 (1 page).

Cuyvers, R., Lauwereins, R., and Peperstraete, J., "Fault-Tolerance in Process Control: Possibilities, Limitations and Trends," Journal A, vol. 31, No. 4, 1990, pp. 33-40.

An International Search Report, dated Sep. 9, 2009 for copending PCT patent application No. PCT/US2009/03075, filed Aug. 1, 2009 (5 pages).

* cited by examiner

METHODS AND SYSTEMS FOR VITAL BUS ARCHITECTURE

BACKGROUND

This invention relates generally to control systems, and more particularly to methods and systems for implementing high integrity control of safety critical control systems.

At least some known control systems, including control systems in nuclear power plants, aircraft, and other applications where high reliability is determined to be needed, are qualified for those applications after rigorous testing and certification of all the components of the system. Components that do not meet the rigorous criteria are segregated from the qualified components and are not permitted to perform safety-related functions. Such rigorous testing is expensive and time consuming and may be able to be accommodated in new construction of a new model of equipment or new construction of a power plant. However, retro-fitting components for a safety-related system into an existing system, for example, a standard locomotive can be cost prohibitive.

To permit trains to operate autonomously having what is termed a "zero man crew", operation with de-skilled operators, or operation with a "single man crew" requires a level of safety and reliability of the train control system that heretofore does not exist. Replacing all existing control equipment in all existing locomotives represents a cost that will prohibit implementation of the zero-man-crew concept. A method and system for supervising the operation of low vitality equipment to permit high vitality operation of the vehicle control system is needed.

SUMMARY

In one embodiment, a high integrity safety critical bus system for communicating data in a control system includes a plurality of data communication buses configured in a multiple redundant orientation and at least one independent safety supervisor module communicatively coupled to and associated with at least two of the plurality of data communication buses, the safety supervisor including a database including a plurality of logic rules. The logic rules are programmed to receive data from the at least two of the plurality of data communication buses and to determine the validity of the received data from each bus using one or more of the plurality of the logic rules. If the received data is determined to be invalid, the logic rules are programmed to restore the validity of the data using one or more of the plurality of the logic rules. If the data can not be restored the logic rules are programmed to transmit an alert to the control system. Otherwise, the logic rules are programmed to transmit the validated data to an intended destination. Therefore, the vitality resides in the independent safety supervisor module rather than the plurality of the legacy or new equipment being required to achieve vitality. By requiring only the independent safety supervisor module portion of the architecture to be the vital element, legacy or new equipment with relatively low integrity may now be supervised by a vital independent safety supervisor module thus achieving system level vitality without the need to make numerous system elements vital as well.

In another embodiment, a method of implementing safety critical control of a vehicle includes determining an operational state of a plurality of redundant vehicle control devices using at least one of a plurality of logic rules wherein the vehicle control devices are configured to control a function of the vehicle. The method further includes blocking the operation of ones of the plurality of redundant vehicle control devices that are determined to be in an abnormal state, and transmitting control signals to a selected one of the plurality of redundant vehicle control devices.

In yet another embodiment, a vehicle includes a control system and a plurality of low-integrity systems configured to detect operating conditions of the vehicle wherein at least some of the plurality of low-integrity systems are configured to control the operation of the vehicle. The vehicle also includes a safety supervisor module communicatively coupled to and associated with at least one of a control device and an input device associated with each low-integrity system wherein the safety supervisor module is configured to monitor the state of each device using one or more logic rules. The safety supervisor module is also configured to remove control from a device determined to be in an abnormal state wherein supervision of the plurality of low-integrity systems by the safety supervisor module permits operation of the control system as a high-integrity system.

DETAILED DESCRIPTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, implementing safety critical control of a vehicle utilizing a safety critical control with miscompare fault detection and accommodation and independent safety supervision. However, it is contemplated that this disclosure has general application to load elevators, jacks, positioners, and other machines that provide an application of force in vertical, horizontal, and a combination of orientations in industrial, commercial, and residential applications.

Figure 1:
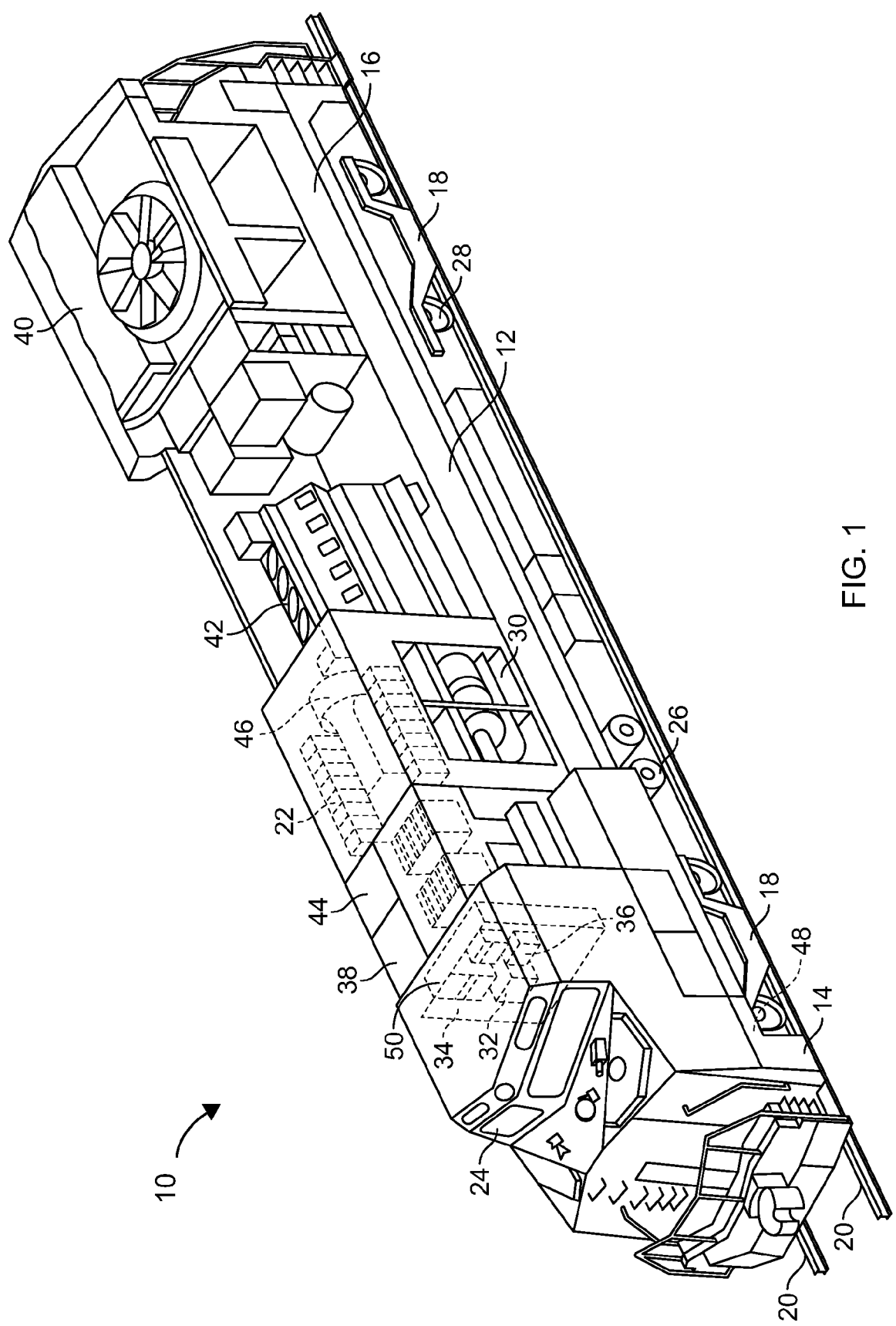
FIG. 1 is a partial cut away view of an exemplary Off-Highway Vehicle (OHV)

FIG. 1 is a partial cut away view of an exemplary Off-Highway Vehicle (OHV). In the exemplary embodiment, the OHV is a locomotive 10. Locomotive 10 includes a platform 12 having a first end 14 and a second end 16. A propulsion system 18, or truck is coupled to platform 12 for supporting, and propelling platform 12 on a pair of rails 20. An equipment compartment 22 and an operator cab 24 are coupled to platform 12. An air and air brake system 26 provides compressed air to locomotive 10, which uses the compressed air to actuate a plurality of air brakes 28 on locomotive 10 and railcars (not shown) behind it. An auxiliary alternator system 30 supplies power to all auxiliary equipment and is also utilized to recharge one or more on-board power sources. An intra-consist communications system 32 collects, distributes, and displays consist data across all locomotives in a consist.

A cab signal system 34 links the wayside (not shown) to a train control system 36. In particular, system 34 receives coded signals from a pair of rails 20 through track receivers (not shown) located on the front and rear of the locomotive. The information received is used to inform the locomotive operator of the speed limit and operating mode. A distributed power control system 38 enables remote control capability of multiple locomotive consists coupled in the train. System 38 also provides for control of tractive power in motoring and braking, as well as air brake control.

An engine cooling system 40 enables engine 42 and other components to reject heat to cooling water. In addition, system 40 facilitates minimizing engine thermal cycling by maintaining an optimal engine temperature throughout the load range, and facilitates preventing overheating in tunnels. An equipment ventilation system 44 provides cooling to locomotive 10 equipment.

A traction alternator system 46 converts mechanical power to electrical power which is then provided to propulsion system 18. Propulsion system 18 enables locomotive 10 to move and includes at least one traction motor 48 and dynamic braking capability. In particular, propulsion system 18 receives power from traction alternator 46, and through traction motors 48 moves locomotive 10. Locomotive 10 systems are monitored and/or controlled by an energy management system 50.

Energy management system 50 generally includes at least one computer that is programmed to perform the functions described herein. Computer, as used herein, is not limited to just those integrated circuits referred to in the art as a computer, but broadly refers to a processor, a microprocessor, a microcontroller, a programmable logic controller, an application specific integrated circuit, and another programmable circuit, and these terms are used interchangeably herein.

Figure 2A:
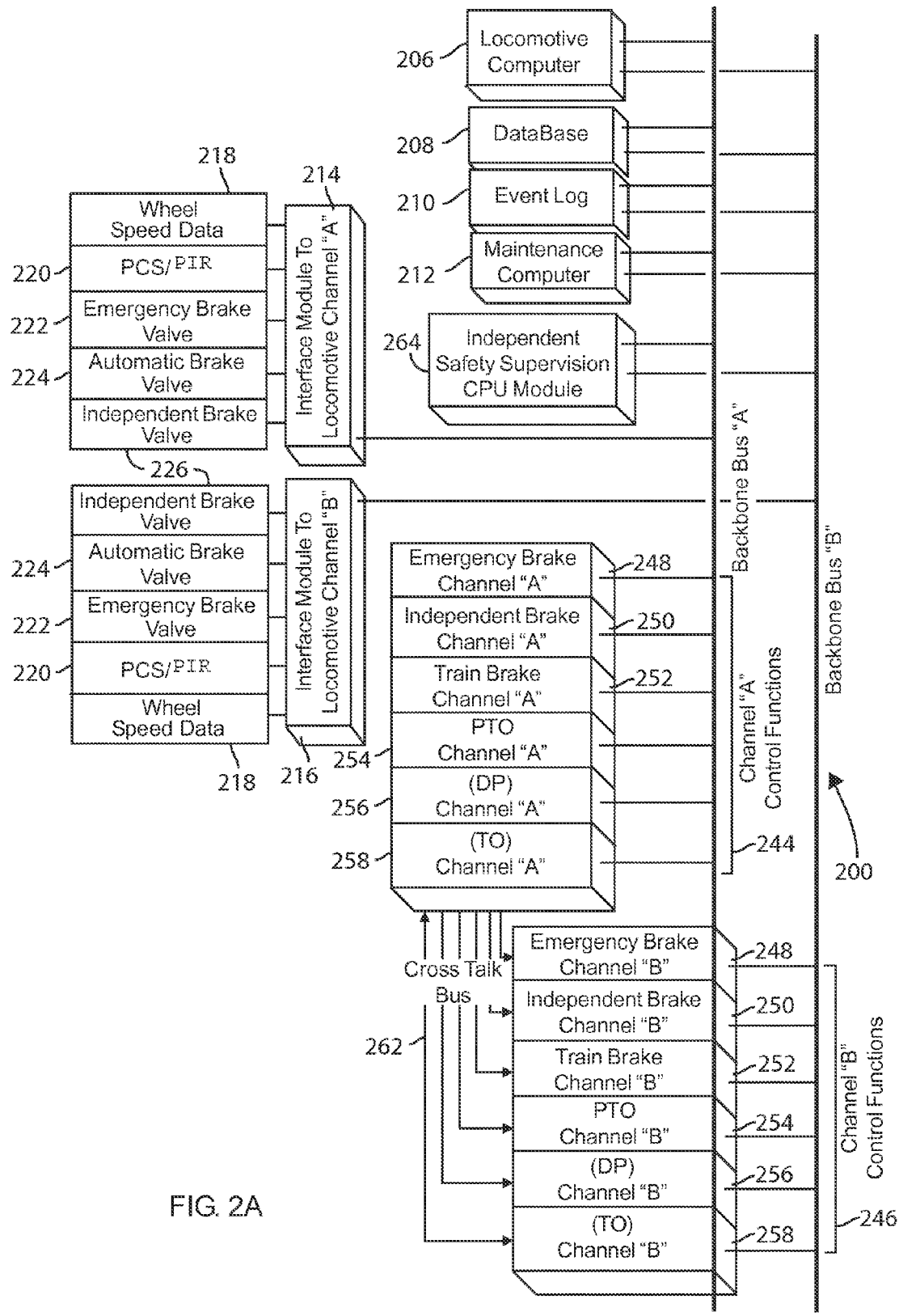
FIG. 2 is a schematic diagram of an exemplary architecture of a high integrity vehicle communication bus system in accordance with an embodiment of the present invention.
Figure 2B:
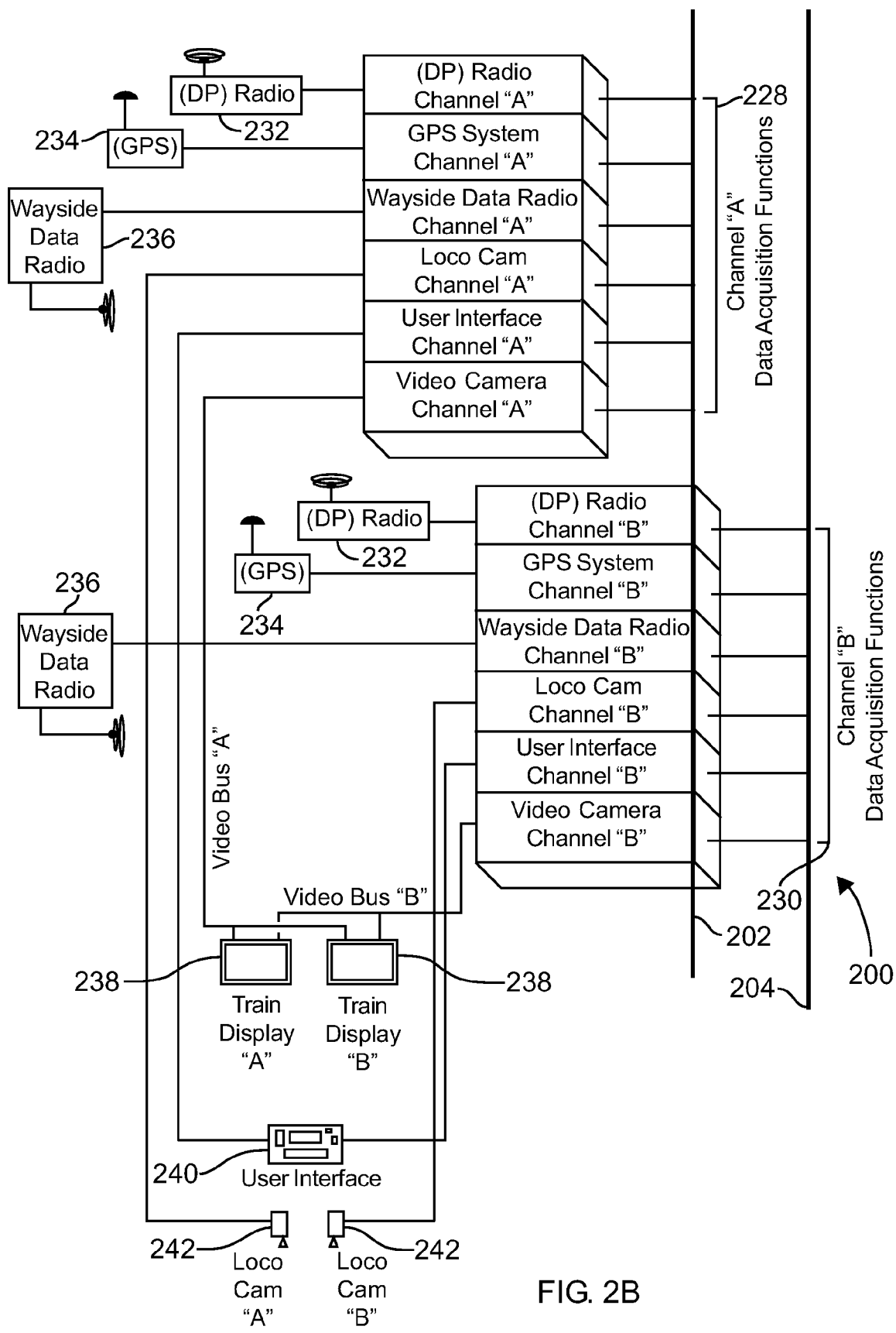

FIG. 2 is a schematic diagram of an exemplary architecture of a high integrity vehicle communication bus system 200 in accordance with an embodiment of the present invention. In the exemplary embodiment, communication bus system 200 includes a plurality of data buses, which may be designated by channel numbers, for example, a channel 'A' bus 202 and a channel 'B' bus 204. Although described with reference to two redundant communication buses, communication bus system 200 may include any number of redundant channels.

A plurality of components are coupled separately to each bus. Separation between buses may comprise electrical separation or may include physical separation in addition to electrical separation. Physical separation generally permits a greater degree of integrity because common mode failures affecting one bus is physically isolated from each other bus facilitating minimizing the possibility of a single incident affecting more than one bus. The components include a locomotive computer 206, a database 208, an event log 210, and a maintenance computer 212. A channel 'A' interface module 214 is coupled to channel 'A' bus 202 and a channel 'B' interface module 216 is coupled to channel 'B' bus 204. Each interface module 214 and 216 is configured to receive analog and digital signals from vehicle sub-systems and transmit data representing the received analog and digital signals onto respective buses 202 and 204. The vehicle sub-systems communicating through interface modules 214 and 216 include but are not limited to a speed data sub-system 218, a power cutoff switch/power interrupt relay (PCS/PIR) sub-system 220 to remove tractive effort, an emergency brake valve sub-system 222, an automatic brake valve sub-system 224, and an independent brake valve sub-system 226.

In the exemplary embodiment, buses 202 and 204 are also configured to receive signals from respective data acquisition modules 228 and 230. Data acquisition modules 228 and 230 are configured to receive signals from vehicle components configured to acquire information relating to the environment proximate the vehicle. The components include, but are not limited to an intra-train distributed power (DP) radio 232, a global positioning satellite (GPS) system 234, a wayside data radio 236, a train display 238, a user interface 240, and a video camera 242.

Also in the exemplary embodiment, buses 202 and 204 are configured to transmit signals to respective control function modules 244 and 246. Control function modules 244 and 246 are further configured to receive digital signals representing commands and transmit analog and digital signals representing the received commands from respective buses 202 and 204 to associated vehicle control sub-systems. Such sub-systems include but are not limited to an emergency brake sub-system 248, an independent brake sub-system 250, a train brake sub-system 252, a positive train control (PTC) sub-system 254, a distributed power (DP) sub-system 256, and a trip optimizer (TO) sub-system 258.

Each of emergency brake sub-system 248, independent brake sub-system 250, train brake sub-system 252, PTO sub-system 254, distributed power (DP) sub-system 256, and trip optimizer (TO) sub-system 258 of one channel is configured to cross-talk with like sub-systems of any other channel using a cross talk bus 262. The number of channels depends on the number of communication buses utilized in a particular installation. As used herein, crosstalk defines communication between two or more of the sub-systems so that their results can be checked.

System 200 includes an independent safety supervision module 264 communicatively coupled to each communication bus utilized in system 200. Safety supervision module 264 includes a plurality of logic rules that are applied to data in real-time as the data is transmitted on the communication buses. Safety supervision module 264 processes the rules during transmission of the data to identify and localize faults associated with the communication buses and/or the sub-systems communicatively coupled to the buses. In some cases, the rules may utilize other channel data, historical, or derived data to restore corrupted or missing data. In other cases, when data faults are detected, safety supervisor module 264 blocks the transmission of the data to other components. Utilizing the rules stored in safety supervisor module 264 a commercial off the shelf component or a component having a lower safety integrity level (SIL) than is regulatorily required for the system may be made to comply with the regulatory requirements for the system using safety supervisor module 264.

Figure 3:
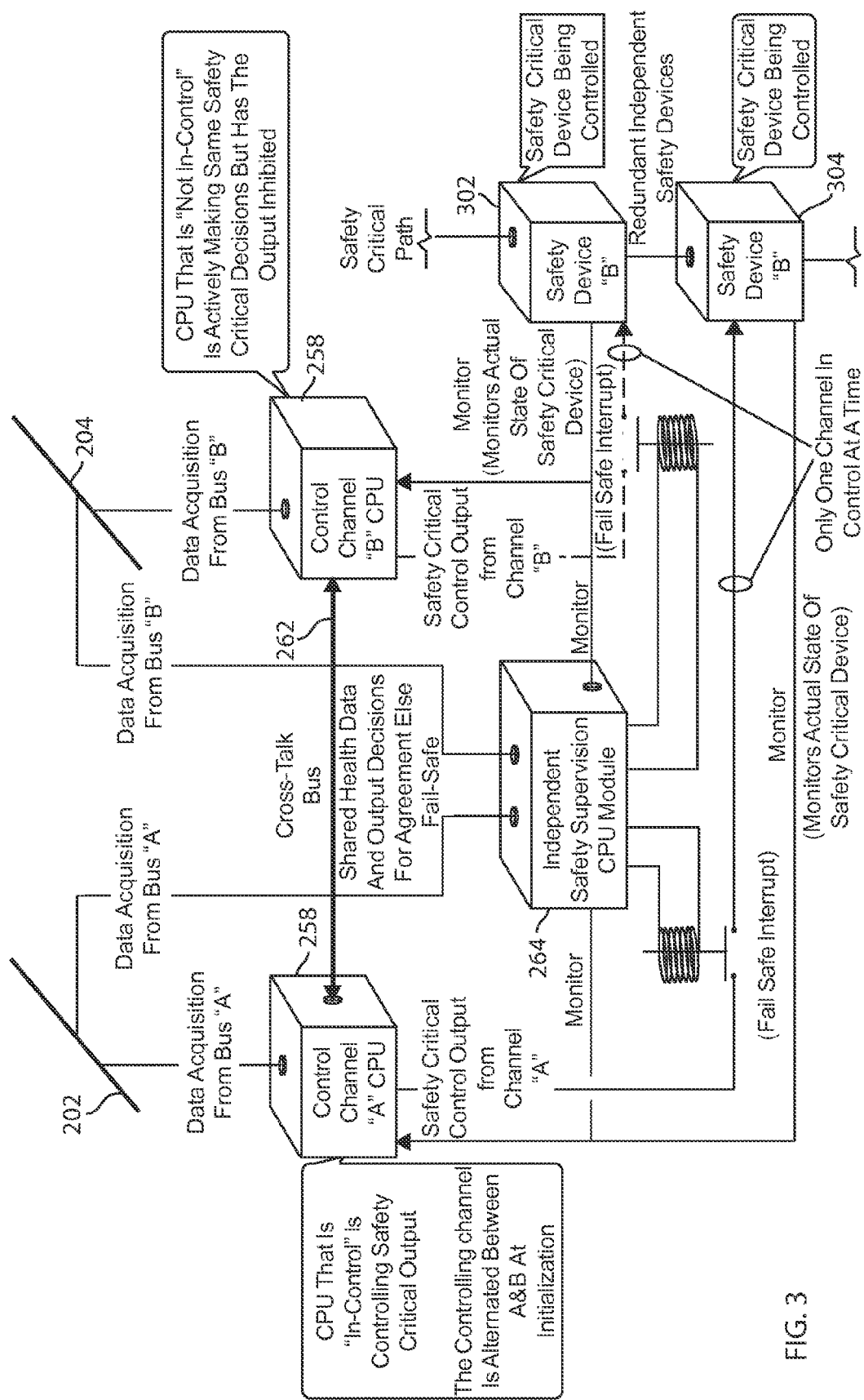
FIG. 3 is an enlarged schematic block diagram further illustrating safety supervisor module, shown in FIG. 2, utilizing a safety critical control with miscompare fault detection and accommodation and independent safety supervision.

FIG. 3 is an enlarged schematic block diagram further illustrating safety supervisor module 264 (shown in FIG. 2) utilizing a safety critical control with miscompare fault detection and accommodation and independent safety supervision. In the exemplary embodiment, a safety device 302 such as a locomotive throttle actuator is monitored by respective controlling trip optimizer sub-system 258. A second safety device 304 such as a redundant throttle actuator is monitored by its respective controlling trip optimizer sub-system 258. Safety devices 302 and 304 are also monitored by safety supervisor module 264. Independent monitoring of safety devices 302 and 304 permits additional checking of the respective outputs of safety devices 302 and 304 such that components not initially designed for such operation may be qualified to a higher safety level such as for example, a SIL 4 level.

The term "safety" as used herein is not a representation that embodiments of the present invention will make a process safe or that other systems will produce unsafe operation. Rather, safety refers to the probability of an un-acceptable behavior being reduced to an acceptable level as determined by interested parties. Safety, with respect to vehicle operations depends on a wide variety of factors outside of the scope of the present disclosure including design of the control system, installation, and maintenance of the components of the control system, and the cooperation and training of individuals using the control system. Although embodiments of the present invention are intended to be highly reliable, all physical systems are susceptible to failure and provision must be made for such failure.

As used herein "high reliability" refers generally to systems that guard against the propagation of erroneous data or signals by detecting error or fault conditions and signaling their occurrence and/or entering into a predetermined fault state.

Safety Integrity Level (SIL) is defined as a relative level of risk-reduction provided by a safety function, or to specify a target level of risk reduction. Four SIL levels are defined, with SIL4 being the most dependable and SIL1 being the least. A SIL is determined based on a number of quantitative factors in combination with qualitative factors such as development process and safety life cycle management. The requirements for a given SIL are not consistent among all of the functional safety standards. The international standard IEC 61508 defines SIL using requirements grouped into two broad categories: hardware safety integrity and systematic safety integrity. A device or system must meet the requirements for both categories to achieve a given SIL.

The SIL requirements for hardware safety integrity may be based on a probabilistic analysis of the device. To achieve a given SIL, the device must have less than the specified probability of dangerous failure and have greater than the specified safe failure fraction. These failure probabilities are calculated by performing for example, a Failure Modes and Effects Analysis (FMEA). The actual targets required vary depending on the likelihood of a demand, the complexity of the device(s), and types of redundancy used.

The SIL requirements for systematic safety integrity define a set of techniques and measures required to prevent systematic failures (bugs) from being designed into the device or system. These requirements can either be met by establishing a rigorous development process, or by establishing that the device has sufficient operating history to argue that it has been proven in use. Electric and electronic devices can be certified for use in functional safety applications according to IEC 61508, providing application developers the evidence required to demonstrate that the application including the device is also compliant.

As will be appreciated by one skilled in the art and based on the foregoing specification, the above-described embodiments of the disclosure may be implemented using computer programming or engineering techniques including computer software, firmware, hardware or any combination or subset thereof, wherein the technical effect is implementing safety critical control of a vehicle utilizing a safety critical control with miscompare fault detection and accommodation and independent safety supervision. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Vehicle control systems may include special purpose computers used in controlling the vehicle. Under the direction of a stored control program, the vehicle control system examines a series of inputs reflecting the status of the vehicle and surrounding environment and changes a series of outputs controlling the vehicle. The inputs and outputs may be binary or analog, providing a value within a continuous range. The inputs may be obtained from sensors attached to the controlled equipment and the outputs may be signals to actuators on the controlled equipment.

The above-described methods and systems of controlling a vehicle are cost-effective and highly reliable. The methods and systems facilitate utilizing existing, commercial off the shelf, and lower vitality or safety rated equipment in higher safety integrity level systems using independent safety monitoring modules that are configurable to accommodate a varied type of equipment in a cost-effective and reliable manner.

While embodiments of the disclosure have been described in terms of various specific embodiments, those skilled in the art will recognize that the embodiments of the disclosure can be practiced with modification within the spirit and scope of the claims.

What is claimed is:

1. A safety critical bus system for communicating data in a control system, said bus system comprising:
   a plurality of data communication buses configured in a multiple redundant orientation;
   at least one safety supervisor module communicatively coupled to and associated with at least two of said plurality of data communication buses, said safety supervisor comprising a database including a plurality of logic rules, said logic rules programmed to:
      receive data from the at least two of said plurality of data communication buses;
      determine the validity of the received data from each bus using one or more of the plurality of the logic rules;
      if the received data is determined to be invalid, restore the validity of the data using one or more of the plurality of the logic rules;
      if the data can not be restored transmit an alert to the control system; and
      transmit the validated data to an intended destination; and wherein
   said safety supervisor module is configured to determine a type of device coupled to the associated bus, and further configured to select one or more logic rules programmed to detect faults in the device, instigate data replacement logic rules for the device while the fault exists, and alert the control system when the severity of the fault exceeds a predetermined threshold.

2. A safety critical bus system for communicating data in a control system, said bus system comprising:
   a plurality of data communication buses configured in a multiple redundant orientation;
   at least one safety supervisor module communicatively coupled to and associated with at least two of said plurality of data communication buses, said safety supervisor comprising a database including a plurality of logic rules, said logic rules programmed to:
      receive data from the at least two of said plurality of data communication buses;
      determine the validity of the received data from each bus using one or more of the plurality of the logic rules;

if the received data is determined to be invalid, restore the validity of the data using one or more of the plurality of the logic rules;

if the data can not be restored transmit an alert to the control system; and transmit the validated data to an intended destination; and wherein said safety supervisor module comprises a first safety supervisor module communicatively coupled to a first communication bus, and a second safety supervisor module that is separately coupled to a second communication bus, the first and second safety supervisor modules being communicatively coupled one to the other.

3. A vehicle including a control system comprising:

a plurality of low-integrity systems configured to detect operating conditions of the vehicle, the low-integrity systems configured to control operation of the vehicle, the low-integrity systems each comprising redundant vehicle control devices configured to control a function of the operation of the vehicle, each of the redundant vehicle control devices coupled to one of a plurality of separate communication buses;

the redundant vehicle control devices coupled one to the other for communication therebetween via a cross talk bus, the cross talk communication for verifying the output signals between the redundant vehicle control devices; and a safety supervisor module communicatively coupled to and associated with at least one of a control device and an input device associated with each low-integrity system via a respective one of the communication buses, said safety supervisor module configured to monitor the state of each of the vehicle control devices using one or more logic rules, said safety supervisor module configured to remove control from a vehicle control device determined to be in an abnormal state;

wherein independent supervision of the plurality of low-integrity systems by the safety supervisor module permits operation of the control system as a high-integrity system.

4. A system in accordance with claim 3 wherein the plurality of low-integrity systems are at least one of commercial off the shelf, and rated less than safety integrity level (SIL) 4.

5. A system in accordance with claim 3 wherein the control system is rated safety integrity level (SIL) 4.

6. A system in accordance with claim 3 wherein said control system is configured to control movement of the vehicle.

7. A system in accordance with claim 3 wherein each of the separate communication buses is configured in a multiple redundant orientation having at least one of a control device and an input device communicatively coupled thereto through a respective channel controller.

8. A system in accordance with claim 3 further comprising a fail-safe interrupt configured to block control signals from an abnormally functioning vehicle control device.

9. A system in accordance with claim 3 wherein said safety supervisor module is configured to determine the state of an associated vehicle control device and block control signals from the vehicle control device based on the determined state of the control device.

10. A system in accordance with claim 3 wherein said safety supervisor module is configured to determine the validity of the received data from each of the communications buses using one or more of the plurality of the logic rules.

* * * * *